United States Patent [19]

Marshall et al.

[11] 4,182,131
[45] Jan. 8, 1980

[54] HIGH EFFICIENCY AIR CONDITIONER

[76] Inventors: Ralph C. Marshall, 14739-1/2 Oxnard St., Van Nuys, Calif. 91411; Ronald P. Consoli, 16853 Magnolia Blvd., Encino, Calif. 91436

[21] Appl. No.: 964,261

[22] Filed: Nov. 27, 1978

[51] Int. Cl.² .................... F25D 17/06; F28D 5/00
[52] U.S. Cl. ............................................ 62/91; 62/305
[58] Field of Search .............. 62/91, 305, 309, 315, 62/316

[56] References Cited

U.S. PATENT DOCUMENTS

| | | | |
|---|---|---|---|
| 2,270,810 | 1/1942 | Larriva | 62/305 |
| 2,323,511 | 7/1943 | Baker | 62/305 |
| 2,655,795 | 10/1953 | Dyer | 62/305 |
| 2,672,024 | 3/1954 | McGrath | 62/305 |
| 3,108,451 | 10/1963 | Clifford | 62/305 |
| 3,165,902 | 1/1965 | Paugh | 62/305 |
| 4,043,777 | 8/1977 | Parren | 62/315 |
| 4,056,946 | 11/1977 | Bond et al. | 62/305 |
| 4,069,687 | 1/1978 | Larriva | 62/305 |
| 4,107,942 | 8/1978 | Fairman | 62/305 |

Primary Examiner—Lloyd L. King
Attorney, Agent, or Firm—Poms, Smith, Lande & Rose

[57] ABSTRACT

An adiabatic process condensing unit is disclosed for incorporation in air conditioning systems operating in a non-conventional manner to achieve superior energy-saving results. The condensing coils wherein hot Freon gas from the compressor is cooled and condensed to provide liquid Freon for delivery to the evaporator is contained within a path for conducting cooling air therethrough. Prior to passing through the condensing coil, the cooling air is passed through an adiabatic pad wherein it is cooled to wet bulb temperature such that the condensing coil is cooled by wet bulb temperature air rather than ambient air. Additionally, the liquid Freon from the condensing coil is passed through a cooling coil submerged in wet bulb temperature water to provide additional cooling of the liquid Freon. In the preferred embodiment shown, the structure is designed to assure that all air passing through the condenser coil is at wet bulb temperature. Non-conventional sizing relationships between the system components are described which achieve maximum energy conservation.

11 Claims, 11 Drawing Figures

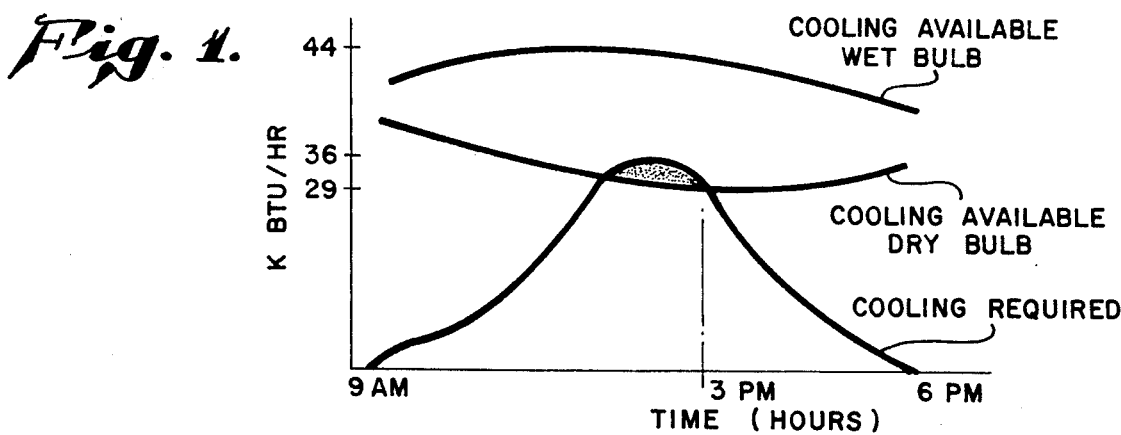
Fig. 1.
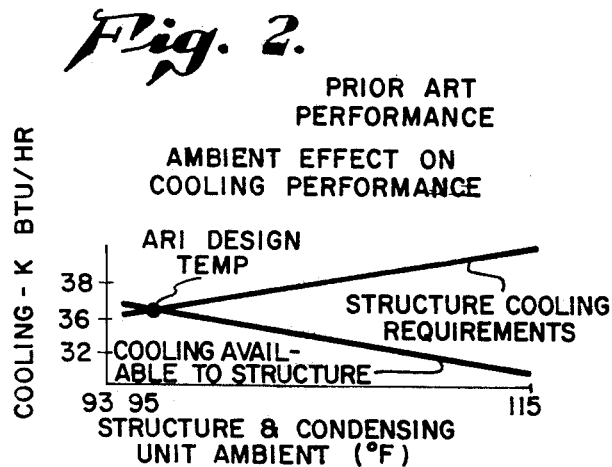
Fig. 2. PRIOR ART PERFORMANCE
AMBIENT EFFECT ON COOLING PERFORMANCE
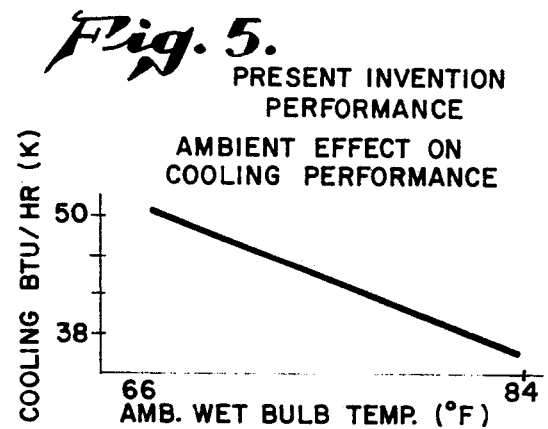
Fig. 5. PRESENT INVENTION PERFORMANCE
AMBIENT EFFECT ON COOLING PERFORMANCE
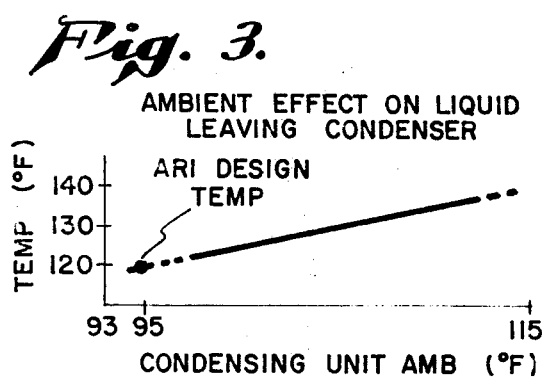
Fig. 3. AMBIENT EFFECT ON LIQUID LEAVING CONDENSER
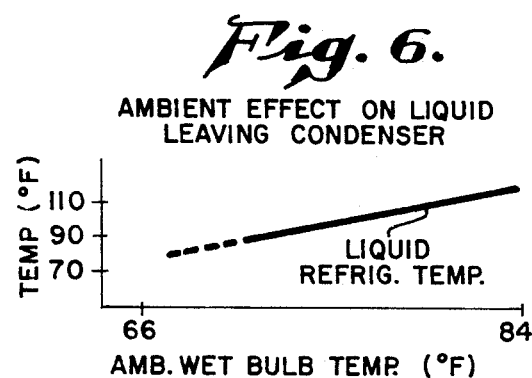
Fig. 6. AMBIENT EFFECT ON LIQUID LEAVING CONDENSER
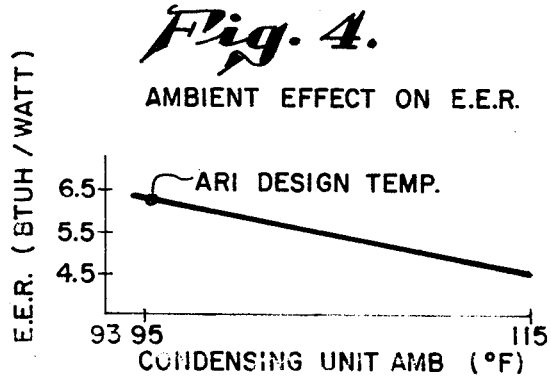
Fig. 4. AMBIENT EFFECT ON E.E.R.
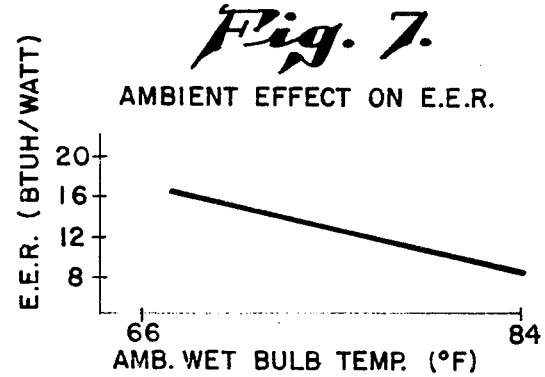
Fig. 7. AMBIENT EFFECT ON E.E.R.

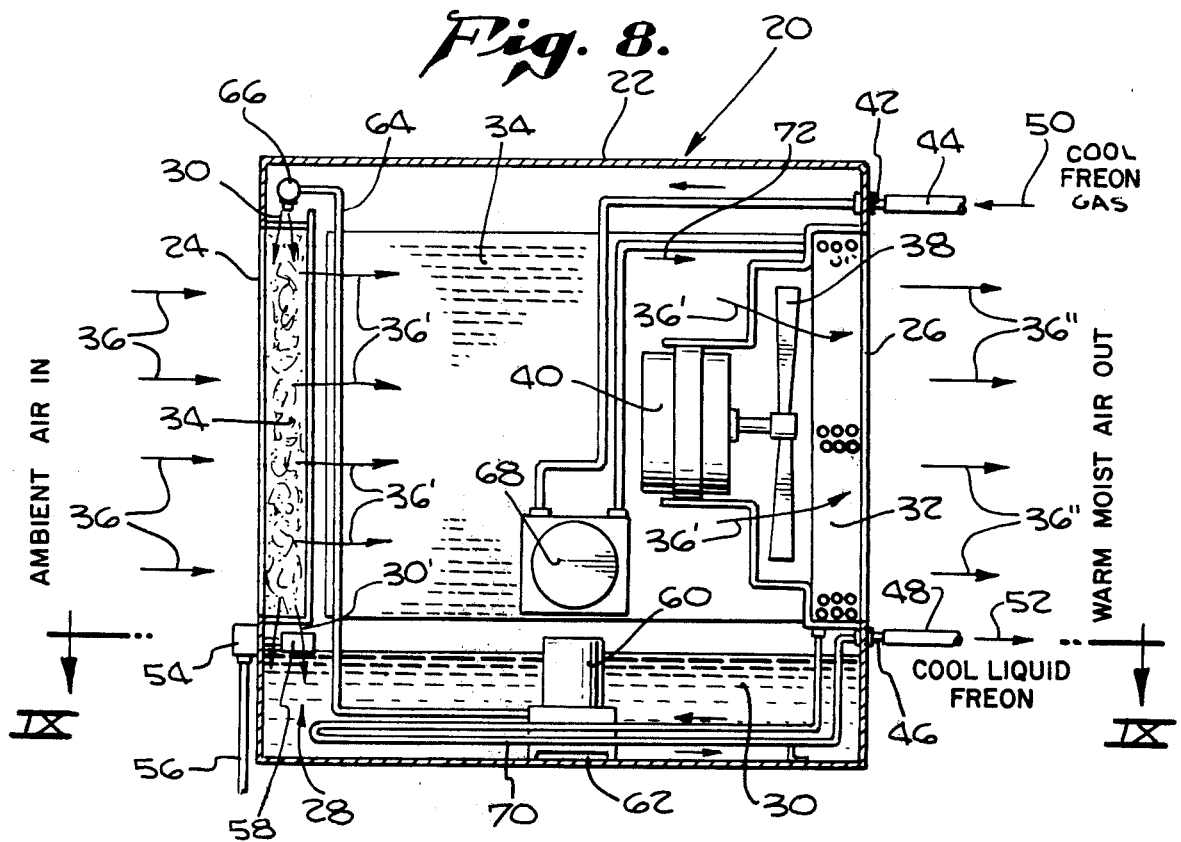
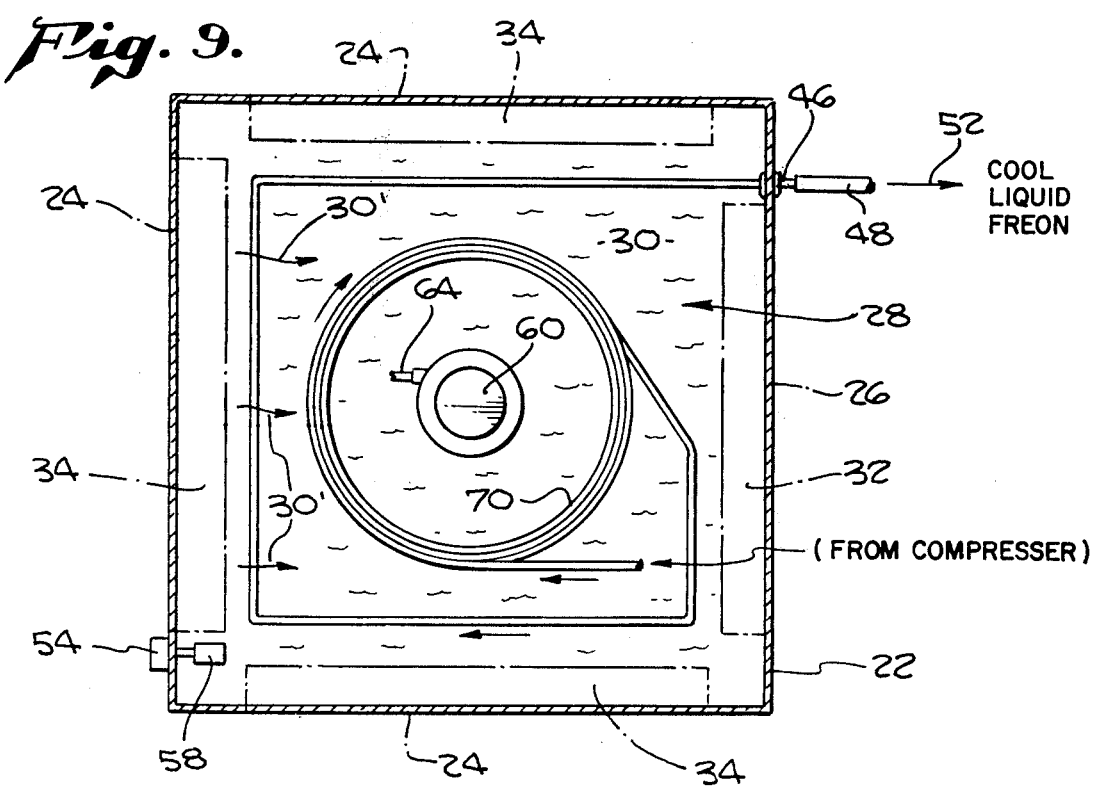

HIGH EFFICIENCY AIR CONDITIONER

BACKGROUND OF THE INVENTION

The present invention relates to air conditioning systems and, more particularly, to Freon-type air conditioning systems where Freon is circulated by a compressor between an evaporator coil and a condenser coil wherein it is repetitively changed between liquid and gas states to effect cooling in the evaporator unit.

In mechanical air conditioning systems of the Freon-type, a compressor pumps heat-containing gaseous Freon to a condensing unit containing finned coils wherein cooling air is directed through the finned coils to cool the Freon to a liquid. Liquid Freon is then conducted to an evaporating unit also having finned coils therein wherein the liquid Freon is flashed to the gaseous state. The change of state from the liquid to gas phase is accompanied by a corresponding heat extraction from air being passed around the finned coils which cools the air for use in lowering the temperature of spaces to which it is then directed. The gaseous Freon is then returned to the compressor for recirculation.

To accomplish the cooling objectives in an optimum manner, the compressor, evaporator unit and condenser unit must be "sized" for operation together. Improper matching of volumes and flow rate capacities causes less than optimum performance. Most design parameters are established by the Air Conditioning and Refrigeration Institute (ARI). Thus, mechanical air conditioning systems of the type described above are designed to remove heat energy from a structure and discharge the heat into a design ambient condition of 95° F., dry bulb. Unfortunately, as the ambient temperature increases, the cooling available to the structure may decrease by as much as 20%, while at the same time, the cooling requirement may increase by as much as 20%.

With the advent of recent recognitions of the shortage of available energy, the air conditioning industry has adopted Energy Efficiency Ratio (EER) as a tool to measure equipment performance in numerical quantities. The EER of a particular air conditioning system is obtained by dividing the cooling capacity in Btu's per hour (Btu/h) by power input in watts. Thus, as the ambient conditions increase above the design figure of 95° F., the EER may decline by as much as 28%. This loss is a result of high compressor head pressures to obtain Freon condensation together with resulting high liquid temperatures. Moreover, power input may increase by as much as 13% as the head pressure rises and the cooling capacity is reduced by the amount of cooling required to cool the hot liquid to a cool liquid at the flash temperature in the evaporator.

Referring briefly to FIG. 1, a graph is shown displaying a number of critical factors. First, it can be seen that the typical cooling required of a structure increases beginning at early morning to a high in the early afternoon and then drops off until little or no cooling is required in the late evening. By comparison, the cooling available by dry bulb ambient air for cooling the condenser is higher in the cooler late and morning hours and becomes less as the ambient air heats during the hotter midday hours. As can be seen, typically the cooling required exceeds the cooling available during the hottest hours as indicated by the cross-hatched area of overlap between the cooling available and cooling required curves such that efficiency drops off and power consumption increases at precisely the time when optimum performance is needed most.

The reasons for these can be seen with reference to FIGS. 2, 3, and 4 wherein the performance of typical prior art mechanical air conditioners of the recirculating Freon-type employing dry bulb ambient air cooling are shown. In FIG. 2, it can be seen that as the ambient temperature increases above 95° F., the structure cooling requirements continue to rise while the cooling available to the structure continues to decrease. Since the liquid leaving the condenser is at the ambient temperature, as shown in FIG. 3, the amount of heat absorption capability in the evaporator decreases correspondingly. This is shown graphically in FIG. 4.

Returning to FIG. 1, a third factor is graphed along with the two previously discussed. This factor is the cooling available from wet bulb temperature air. That is, air cooled by the evaporation of moisture therefrom in an adiabatic process at the indicated temperature. As can be seen, the cooling available is well above the graph of the cooling required and, in fact, increases during the hotter noon-day temperatures due to the lower moisture content of the ambient air.

By employing the potential available for cooling in wet bulb temperature air versus the normal use of dry bulb temperature air, it would appear that a more efficient air conditioner could be produced. This, in fact, has been tried with disasterous results. The obvious method is to direct the ambient air through a socall "swamp-cooler" to drop it to wet bulb temperature and then use that air to cool the condenser unit of a conventional Freon-type air conditioner. To do so, however, quickly results in the destruction of compressors improperly protected. In fact, many manufacturers of air conditioners specifically state in their sales materials that such operation of the unit voids the manufacturer's warranty on the product.

Wherefore, it is the object of the present invention to provide air conditioning apparatus of the recirculating Freon-type employing adiabatic cooling of the condenser as a part thereof so as to increase the cooling performance and boost the EER to levels previously unobtainable while, at the same time, eliminating the destructive effects previously encountered in such operation.

SUMMARY

The foregoing objectives have been met by the present invention in air conditioning apparatus wherein Freon is circulated between a condensing heat exchanger and an evaporating heat exchanger by a compressor and the condensing heat exchanger has ambient air passed therethrough to remove heat therefrom by the method of passing the ambient air used in cooling the condensing heat exchanger through an adiabatic cooling zone prior to passing it through the condensing heat exchanger whereby the air entering the condensing heat exchanger is at the wet bulb temperature. In the preferred embodiment shown, this is accomplished by disposing the condensing heat exchanger close adjacent an adiabatic pad; saturating the adiabatic pad with water; and, passing air through the adiabatic pad and then the condensing heat exchanger.

To provide superior results, the step of saturating the adiabatic pad with water is accomplished by pumping water from a first location in a sump to the top of the adiabatic pad from whence it falls by gravity through the pad back to the sump at a second location; and, additionally, conducting the condensed liquid Freon from the condensing heat exchanger flowing to the evaporating heat exchanger through the sump between the second and first locations whereby the condensed liquid Freon is sub-cooled in a wet bulb temperature bath to reduce the amount of heat rejection needed in the evaporating heat exchanger to flash the liquid Freon to gas.

For accomplishing the foregoing method, an improved condenser is disclosed comprising a conduit having an inlet end and an outlet end; a condenser coil having an inlet and an outlet for the passage of Freon therethrough between the inlet and the outlet, the coil being disposed transverse the conduit such that air passing through the conduit passes through the coil whereby a heat exchange can occur between the coil and the air; means disposed adjacent the inlet end of the conduit for adiabatically cooling ambient air to the wet bulb temperature; and, means for passing ambient air through the adiabatic cooling means and then through the conduit whereby the coil and the Freon therein are cooled by wet bulb temperature air.

In the preferred embodiment, the adiabatic cooling means comprises an adiabatic pad disposed transverse the conduit so that air entering the inlet of the conduit must pass through the pad; sump means for containing a quantity of water and for receiving water from the pad at a second location thereof; and, pump means for pumping water from a first location of the sump means to the top of the pad to pass therethrough by gravity back to the sump means at the second location; and additionally comprises, a cooling coil connected in series with the outlet of the condenser coil, the cooling coil being disposed in the sump between the second and first locations whereby the liquid Freon from the condenser coil is cooled by wet bulb temperature water prior to passing to the evaporator.

To assure proper operation, the air passing means comprises a powered fan transverse the conduit adjacent the outlet to draw air through the inlet; and, the conduit includes vent means disposed in the walls thereof between the condenser coil and the fan and communicating with a source of ambient air for supplying an additional quantity of air into the conduit in an amount sufficient to cause only wet bulb temperature air to be drawn through the condenser coil.

DESCRIPTION OF THE DRAWINGS

FIG. 1 is a graph of cooling required, cooling available (dry bulb), and cooling available (wet bulb) in time of day between 9 a.m. and 6 p.m. versus thousands of B.t.u. per hour.

FIG. 2 is a graph of structure cooling requirements and cooling available to the structure in ambient degrees F. versus thousands of B.t.u. per hour for prior art Freon-type air conditioning systems.

FIG. 3 is a graph of ambient effect on liquid leaving the condenser as a function of condensing unit ambient temperature in degrees F. versus ambient air temperature in degrees F. for prior art Freon-type air conditioning systems.

FIG. 4 is a graph of ambient effect on EER of condensing unit ambient temperature in degrees F. versus EER (i.e. B.t.u. h/watts).

FIG. 5 is a graph of ambient effect on cooling performance of ambient wet bulb temperature in degrees F. versus thousands of B.t.u. per hour as achieved by apparatus according to the present invention.

FIG. 6 is a graph of ambient effect on liquid leaving the condenser as a function of ambient wet bulb temperature in degrees F. versus temperature in degrees F. for apparatus according to the present invention.

FIG. 7 is a graph of ambient effect on EER showing wet bulb temperature in degrees F. versus EER for apparatus according to the present invention.

FIG. 8 is a simplified cut-away elevation of apparatus according to the present invention in one embodiment thereof.

FIG. 9 is a cut-away plan view of the apparatus of FIG. 8 in the plane IX—IX.

DESCRIPTION OF THE PREFERRED EMBODIMENT

Figure 10:
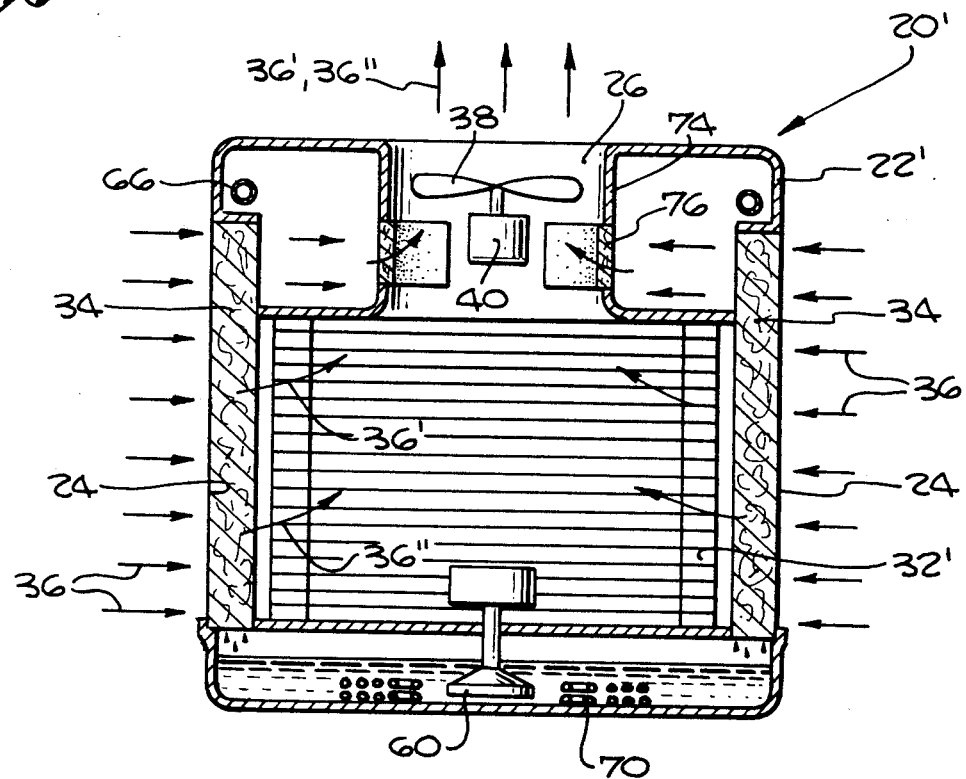
FIG. 10 is a cut-away elevation through apparatus of the present invention according to the preferred embodiment thereof.

Referring first to FIGS. 8 and 9, a first embodiment of a condensing unit according to the present invention is shown. The condensing unit, generally indicated as 20, comprises a box-shaped enclosure 22 having an inlet opening 24 on 3 sides and an outlet opening 26 on the fourth side. The bottom of the enclosure 22 is made water-tight to define a sump 28 for containing a quantity of water 30. The enclosure 22 above water 30 thus defines a conduit for the passage of air therethrough between the inlet openings 24 and the outlet opening 26.

A condenser coil 32 is disposed across the outlet opening 26 and adiabatic pads 34 (of rubberized horse hair, excelsior, or the like) are disposed over the inlet openings 24. The condenser coil 32 and adiabatic pads 34 are, therefore, effectively effective conduit formed by box-shaped enclosure 22 such that ambient air (as indicated by the arrows 36) drawn through inlet openings 24 will pass through the adiabatic pads 34 and then pass through the condenser coil 32 prior to exiting through outlet opening 26.

A fan 38 driven by electric motor 40 is disposed within the box-shaped enclosure 22 to draw ambient air 36 in through inlet openings 24 and exhaust it through outlet opening 26 in the above-described manner. The condensing unit 20 is provided with an inlet 42 to which the connecting line 44 from the evaporator (not shown) is attached. Condensing unit 20 also is provided with an outlet 46 to which a second connecting line 48 to the evaporator is attached. Cool Freon gas 50 enters the condensing unit 20 through inlet 42 and cool liquid Freon 52 exits condensing unit 20 through outlet 46. The internal interconnection between inlet 42 and outlet 46 will be described hereinafter.

Water 30 enters the sump 28 through valve 54 from inlet line 56 which is connected to a source of pressurized water (not shown). Valve 54 is controlled by float 58 so as to maintain the level of water 30 within sump 28 substantially constant. A pump 60 is disposed substantially in the center of sump 28 and draws water 30 through the inlet 62 at the bottom thereof exhausting it through outlet line 64 to nozzle 66 located at the top of adiabatic pad 34 from whence it passes by gravity through adiabatic pad 34 to re-enter the sump 28 adjacent the side thereof.

The inlet 42 is connected to one end of the compressor pump 68 which is disposed to deliver hot high pressure Freon gas 72 to one end of the condenser coil 32.

To provide superior results, the outlet line connecting condenser coil 32 with outlet 46 is in the form of a cooling coil 70 which is submerged within the water 30 of sump 28. Cooling coil 70 is positioned between the point at which the water 30' leaving adiabatic pad 34 to wet bulb temperature enters the sump and the inlet 62 of pump 60. In this manner, the wet bulb temperature water 30' is passed across the cooling coil 70 on its path to inlet 62 providing cooling coil 70 with a wet bulb temperature water bath such that the amount of heat rejection needed in the evaporator (not shown) to flash the liquid Freon 52 is reduced.

Thus, it can be seen that the condensing unit 20 draws ambient air 36' through the adiabatic pads 34 by means of fan 38. Ambient air 36 is cooled to wet bulb temperature air 36' which passes through condenser coil 32 and exits the condensing unit 20 as warm moist air 36''. In so doing, the hot Freon gas 72 is cooled by lower temperature wet bulb air instead of the dry bulb air providing the attendant benefits described above.

Referring now to FIG. 10, the present invention in its preferred embodiment is shown. As shown in FIG. 10, the condensing unit 20' of the preferred embodiment is again placed in a box-shaped enclosure 22'. To effect the cooling of the condenser coil 32 entirely with adiabatic wet bulb temperature air and, additionally, provide more space for a larger capacity condenser coil 32 (e.g. three-ton rating) for reasons to be discussed hereinafter, condenser coil 32 is disposed concentrically about the vertical center of the box-shaped enclosure 22 being cylindrical in shape. The inlet opening 24 is provided on the four sides of the box and the outlet opening 26 is disposed facing outwardly upward in concentrical relationship with the cylindrical condenser coil 32'. The fan 38 and electric motor 40 are disposed within the effective conduit thus formed adjacent the outlet opening 26. Thus, fan 38 draws the ambient air 36 through the side inlet openings 24 through the cylindrical condenser coil 32' and then forces it vertically outward through outlet opening 26.

An additional important modification is incorporated within the preferred embodiment of FIG. 10 in relation to the inlet openings 24 and condenser coil 32 in addition to the description heretofore. As will be noted, the height of inlet openings 24 in condensing unit 20' is higher than the condenser coil 32'. This is for an important reason. Whereas in the embodiment of FIGS. 8 and 9, the entire box-shaped enclosure 22 formed the effective conduit between the inlet opening 24 and outlet opening 26. In the preferred embodiment, an additional conduit bulkhead 74 is disposed to create the upper boundaries of the effective conduit between the top of condenser coil 32 adjacent inlet opening 24 and outlet opening 26. The conduit bulkhead 74 contains vents 76 therethrough disposed between the condenser coil 32 and outlet opening 26. A distance of approximately 5 to 10 inches of inlet opening 24 is provided above the top of conduit bulkhead 74. As can be seen, the adiabatic pads 34 are disposed over the entire inlet opening 24 as in the previous embodiment. Likewise, pump 60 is again used to pump water 30 through nozzle 66 to the top of the adiabatic pads 34. As fan 38 is driven by electric motor 40, the rated cubic feet per minute of air 36 will be drawn through inlet opening 24 and forced out through outlet opening 26. If condenser coil 32 covered the entire opening 24 the air passing through the top portion of condenser coil 32 would still be at ambient temperature. The water 30 and the air exiting the adiabatic pad do not reach wet bulb temperature until the water has dropped through the adiabatic pad about six or eight inches depending on the air velocity through the adiabatic pads and the surface available for evaporation in the pads. By incorporating the configuration of FIG. 10, the vents 76 can be adjusted (manually or automatically) to maintain the total airflow required by fan 38 while simultaneously splitting the portion passing through condenser coil 32 and that entering through vents 76 so as to maintain the portion passing through condenser coil 32 at a flow rate sufficient to allow it to achieve the full wet bulb temperature capable at any time.

Figure 11:
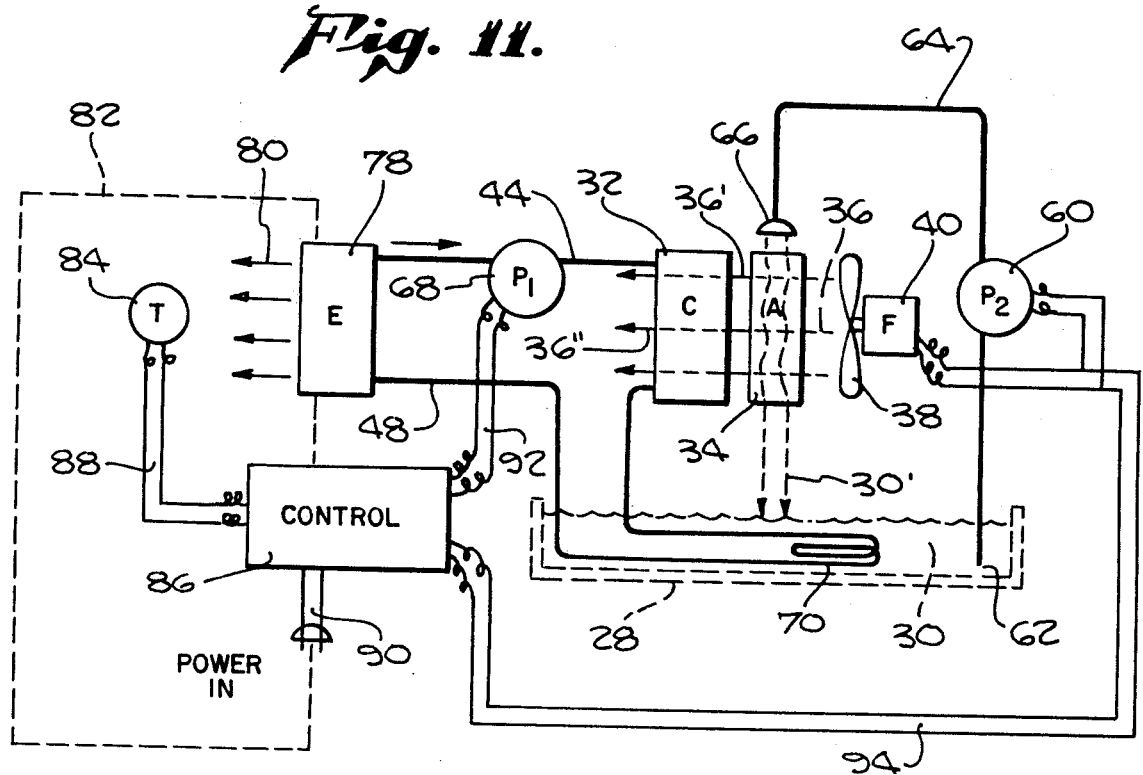
FIG. 11 is a simplified block diagram of the preferred method for controlling the elements of an air conditioning system employing the adiabatic condenser method and apparatus of the present invention.

Referring now to FIG. 11, the preferred control system and the apparatus of the present invention are shown in simplified form. As can be seen, water 30 is pumped from inlet 62 by pump 60 to nozzle 66 through outlet line 64 from whence it falls through adiabatic pad 34 back to sump 28. Ambient air 36 is forced through adiabatic pad 34 and condenser coil 32 by fan 38 driven by motor 40. As ambient air 36 passes through the water saturated adiabatic pad 34, it becomes wet bulb temperature air 36' which is used to cool the condenser coil 32. Cool gaseous Freon is pumped from the evaporator 78 by compressor pump 68 to condenser 32 through connecting line 44. The hot compressed Freon gas is cooled and liquified within condenser coil 32 and then passes through cooling coil 70 disposed within sump 28 where it is further subjected to a wet bulb temperature water bath as wet bulb temperature water 30' moves towards inlet 62 of pump 60 passing across cooling coil 70 in the process. The cooled liquid Freon then returns to the evaporator 78 through connecting line 48 where it flashes to the gaseous state cooling evaporator 78 which in turn is used to cool conditioning air 80 entering the space indicated by the dotted area 82. A thermostat 84 is positioned within space 82 to detect the temperature thereof and allow setting of a desired temperature level to be maintained. Thermostat 84 is connected to control unit 86 through wires 88. Control unit 86, in turn, is connected through input wires 90 to an appropriate source of power for driving pumps 60, 68 and the fan motor 40. Control unit 86 is connected to operate compressor pump 68 through output wires 92 and connected to simultaneously operate fan motor 40 and water pump 60 through output wires 94. As thermostat 84 senses a need for additional cool air within space 82, a signal is sent to control unit 86 through wires 88. Control unit 86 is adapted to start fan motor 40 and pump 60 and allow them to run for approximately three minutes before starting compressor pump 68. This allows cooling coil 70 and the Freon contained therein to achieve wet bulb temperature and condenser coil 32 to be precooled by wet bulb temperature air 36' to reduce starting loads on the system.

It should be noted that in a tested embodiment to be described hereinafter, the cooling coil 70 was of $\frac{3}{8}''$ O.D. copper tubing of at least 45' in length and being coiled on a diameter of 1.5 feet. Further, the air velocity across the adiabatic pads should be maintained at a minimum of 200 feet per minute.

Thus, it can be seen from the foregoing description that the apparatus of the present invention provides a number of important features:

1. The condensing coil is always cooled by wet bulb temperature air giving greater heat rejection.

2. The condensed liquid Freon is sub-cooled in a wet-bulb temperature water bath to reduce the amount of heat rejection in the evaporator to flash the liquid.

3. The top 5 inches to 10 inches of air passing through the adiabatic pad is bypassed above the condensing coil so that all the air through the condensing coil is at the wet bulb temperature.

4. The water pump is located at the center of the sub-cooling coil to cause the wet bulb temperature water entering the sump from the adiabatic pads adjacent the outer perimeter to a flow across the immersed coil.

5. The compressor time delay circuit incorporated in the control unit allows the fan and water pump to run for approximately three minutes before compressor start up to pre-cool the system and, thereby, reduce starting loads.

6. The condensing coil removes 95% of the heat rejected and the submerged cooling coil removes 5% of the heat.

7. Cost reduction in operation is up to 70%.

As mentioned under Background of the Invention, the basic concept employed in the apparatus of the present invention of cooling the Freon-type condenser with adiabatically pre-cooled air has been unsuccessfully tried by others. The apparatus and method of operation of the present invention is entirely different from water evaporative devices that are added on to existing air-cooled condensing units.

In particular, the typical air-cooled condensing unit designed according to the prior art and ARI standards is designed to operate with an ambient temperature swing of 45° F., which necessitates a closely controlled charge of Freon to permit a super-heat range of up to 30° F. Adding an evaporative device to this type of system can (and usually does under normally encountered conditions) cause a compressor to operate in excessive superheat conditions resulting in insufficient compressor cooling and, ultimately, failure. The high-efficiency condensing unit of the present invention is designed to operate, because of wet bulb conditions, with only a 20° F. temperature swing which reduces the required super-heat swing by one-half. The resulting system is, therefore, always well within the required compressor cooling parameters.

The ideal situation for maximum cooling is to have a saturated Freon vapor leaving the evaporator coil at 33° F. and the liquid Freon flashing at 33° F. to prevent condensate water from freezing on the coil (0° superheat). Compressor performance depends on the ratio of liquid Freon to gaseous Freon in the system. High condenser temperatures have corresponding high gas content and high system pressures and high evaporation temperatures. Low condenser temperatures have corresponding low gas content and low system pressures and low evaporation temperatures. System pressures above those at the design temperature cause higher Freon flow rates through the evaporator up to minimum superheat and possible liquid Freon slugging into the compressor and damage to the compressor valves. It is necessary therefore to design conventional systems and Freon quantity to a maximum operating temperature of 115° F. to prevent compressor damage and accept derated performance as condensing temperatures decrease and evaporator flow rate decreases and superheat increases until the flow rate no longer supplies enough cool Freon vapor to cool the compressor (maximum superheat). Because of these design constraints of typical prior-art "sizing", this can result in only a 15-20% filling of the coil at 30° of superheat.

With increases in the outside temperature such as possible in the United States southwest, system performance quickly approaches a point where the system is ineffective with high energy requirements and high evaporation temperatures.

If, then, this conventional system has its standard condenser coil cooled with wet bulb air from a standard "swamp" cooler, the resulting smaller quantity of Freon gas, the low system pressures, and the low Freon vapor flow through the evaporator causes system operation outside of design parameters and ultimate failure.

By contrast, in the present invention, in addition to the above-described apparatus, the "sizing" of the system components is (and must be) made contrary to prior art teachings. That is, the system is sized with an expected 65°-85° F. temperature differential regardless of the actual ambient air. This results in a system design "sizing" parameter of 3°-8° of superheat swing. In actual testing it was found that using the present invention 3° of superheat could be expected in the presence of 115° F. dry desert ambient air.

In terms of conventional ARI sizing, the apparatus of the present invention is used in combination with increased airflow through the evaporator coil and an undersized (less energy consuming) compressor. For example, in one tested embodiment, a four-ton airflow rate through a three-ton rated evaporator was teamed with a three-ton rated condensing coil and a two-ton rated compressor to provide optimum performance. Later, this same installation was operated with a two and one-half ton rated compressor with equally acceptable results. With this combination, a two thousand cubic foot per minute fan was employed to move the adiabatic cooling air through the condensing coil.

Therefore, in addition to the seven important features enumerated above, the following is also true of the present invention when incorporated in an air conditioning system:

8. Condenser sizing is approximately 75% of the rated evaporator tonnage.

9. Heat rejection is up to 140% of the evaporator tonnage.

10. Compressor sizing is approximately 50%-62.5% of the rated evaporator tonnage.

Thus, it can be seen that the air conditioning apparatus of the present invention has truly met its objectives by providing higher performance capability under adverse conditions with lower power requirements thereby giving better performance at lower cost.

Wherefore, having thus described our invention, we claim:

1. In air conditioning apparatus wherein Freon is circulated between a condensing heat exchanger and an evaporating heat exchanger by a compressor and the condensing heat exchanger has ambient air passed therethrough to remove heat therefrom, the method of improving the efficiency of said apparatus comprising the steps of:

(a) sizing the condensing heat exchanger at approximately 75% of the rated tonnage of the evaporating heat exchanger;

(b) sizing the compressor at approximately 50%-62.5% of the rate tonnage of the evaporating heat exchanger; and, (c) passing the ambient air used in cooling the condensing heat exchanger through an adiabatic cooling zone prior to passing it through the condensing heat exchanger so that the air entering the condensing heat exchanger is at the wet bulb temperature.

2. The method of claim 1 wherein said ambient air passing step comprises the steps of:
   (a) disposing the condensing heat exchanger close adjacent an adiabatic pad;
   (b) saturating the adiabatic pad with water by pumping water from a first location in a sump to the top of the adiabatic pad from whence it falls by gravity through the pad back to the sump at a second location;
   (c) passing air through the adiabatic pad and then the condensing heat exchanger; and,
   (d) conducting the condensed liquid freon from the condensing heat exchanger flowing to the evaporating heat exchanger through the sump between said first and second locations so that the condensed liquid freon is sub-cooled in a wet bulb temperature bath to reduce the amount of heat rejection needed in the evaporating heat exchanger to flash the liquid freon to gas.

3. In Freon type air conditioning apparatus having a compressor pumping gaseous Freon to a condenser coil and liquid Freon to an evaporator, the improvement comprising:
   (a) the evaporator being of given rated tonnage;
   (b) the compressor being sized at approximately 50%–62.5% of said rated tonnage of said evaporator; and wherein said condenser comprises,
   (c) a conduit having an inlet end and an outlet end;
   (d) a condenser coil sized at approximately 75% of said rated tonnage of said evaporator having an inlet and an outlet for the passage of Freon therethrough between said inlet and said outlet, said coil being disposed transverse said conduit such that air passing through said conduit passes through said coil whereby a heat exchange can occur between said coil and the air;
   (e) means disposed adjacent said inlet end of said conduit for adiabatically cooling ambient air to the wet bulb temperature; and,
   (f) means for passing ambient air through said adiabatic cooling means and then through said conduit whereby said coil and the Freon therein are cooled by wet bulb temperature air.

4. The air conditioner condensing apparatus of claim 3 wherein said adiabatic cooling means comprises:
   (a) an adiabatic pad disposed transverse said conduit so that air entering said inlet of said conduit must pass through said pad;
   (b) sump means for containing a quantity of water and for receiving water from said pad at a second location thereof; and
   (c) pump means for pumping water from a first location of said sump means to the top of said pad to pass therethrough by gravity back to said sump means at said second location; and additionally comprising,
   (d) a cooling coil connected in series with said outlet of said condenser coil, said cooling coil being disposed in said sump between said first and second locations whereby the liquid Freon from said condenser coil is cooled by wet bulb temperature water prior to passing to the evaporator.

5. The air conditioner condensing apparatus of claim 4 and additionally comprising:
   a controller having an input for receiving a signal to start the condensing unit and an input for connection to a power source, said controller further having a first output connected to said ambient air passing means and said pump means and a second output connected to the compressor, said controller being adapted to turn on said ambient air passing means and said pump means upon receiving a signal to start the condenser for a period sufficient to establish wet bulb temperature air and water flow in the condensing unit before turning on the compressor.

6. The air conditioner condensing apparatus of claim 3 wherein:
   (a) said air passing means comprises a powered fan transverse said conduit adjacent said outlet to draw air through said inlet; and,
   (b) said conduit includes vent means disposed in the walls thereof between said condenser coil and said fan and communicating with a source of ambient air for supplying an additional quantity of air into said conduit in an amount sufficient to cause only wet bulb temperature air to be drawn through said condenser coil.

7. An improved condensing unit for circulating freon-type air conditioners comprising:
   (a) a box-like enclosure having a sump in the bottom thereof for containing a quantity of water, said enclosure having an inlet opening and an outlet opening in the walls thereof above said sump;
   (b) means connectable to a source of water for maintaining a quantity of water in said sump;
   (c) fan means connectable to an appropriate source of power for moving air through said enclosure by entering said inlet opening and exiting said outlet opening;
   (d) an adiabatic pad covering said inlet opening;
   (e) pump means connectable to an appropriate source of power for pumping water from said sump to saturate said adiabatic pad and then return to said sump;
   (f) a first cooling coil disposed between said inlet opening and said outlet opening to have wet bulb air passing through said enclosure in heat exchange relationship therewith, said first cooling coil being connectable to receive freon gas on one end and to deliver freon liquid condensed therein on the other end; and,
   (g) baffle means disposed between said inlet opening and said fan means for dividing said enclosure into a first enclosure communicating between said inlet opening and said outlet opening and having said first cooling coil therein and a second enclosure communicating with said inlet opening, said baffle means including vent means disposed therein between said first cooling coil and said fan means communicating between said first and second enclosures for supplying air from said second enclosure into said first enclosure in an amount sufficient to maintain the airflow from said inlet opening through said first cooling coil at the wet bulb temperature.

8. The air conditioning condensing unit of claim 7 and additionally comprising:
   a second cooling coil disposed in series with said first cooling coil to receive the liquid Freon therefrom, said second cooling coil being disposed within said sump adjacent the point of return of water to said sump from said adiabatic pad to be cooled by the wet bulb temperature water therefrom.

9. The air conditioning condensing unit of claim 7 and additionally comprising:
controller means connected to an appropriate source of power, said pump means, said fan means, the air conditioner compressor, and a source of control signals indicating the air conditioner is to be turned on for starting said pump and fan means and then the compressor with a sufficient time delay before turning on the compressor that a flow of wet bulb cooling air is established whereby starting loads on the system are reduced.

10. An air conditioning system comprising:
(a) an evaporating heat exchanger of a rated tonnage and having an appropriate charge of Freon therein;
(b) a condensing heat exchanger of a rated tonnage equal to approximately 75% of the rated tonnage of said evaporating5heat exchanger, said condensing heat exchanger being operably connected on one side to said evaporating heat exchanger for the flow of Freon therebetween;
(c) a compressor of a rated tonnage equal to approximately 50–62.5% of the rated tonnage of said evaporating heat exchanger, said compressor being operably connected between the other sides of said evaporating and condensing heat exchangers to form a closed-loop system for the pumped flow of said Freon by said compressor; and,
(d) means for passing wet bulb temperature air through said condensing heat exchanger in heat exchange relationship therewith whereby said condensing heat exchanger is coled only by wet bulb temperature air.

11. The air conditioning system of claim 10 and additionally comprising:
means for bathing a portion of the interconnection between said compressor and said evaporator in wet bulb temperature water.

* * * * *